(12) United States Patent
Cink et al.

(10) Patent No.: US 8,769,866 B2
(45) Date of Patent: Jul. 8, 2014

(54) HIGH PRESSURE INJECTION SYSTEM FOR APPLYING A PESTICIDE BENEATH THE SURFACE OF THE GROUND

(75) Inventors: James H. Cink, Ballwin, MO (US);
Richard A. Warriner, Wake Forest, NC (US); Chris des Garennes, Elkton, MD (US); Peter van Drumpt, Wayside, NJ (US)

(73) Assignee: BASF Agro B.V. (CH)

( * ) Notice: Subject to any disclaimer, the term of this patent is extended or adjusted under 35 U.S.C. 154(b) by 309 days.

(21) Appl. No.: 13/033,432

(22) Filed: Feb. 23, 2011

(65) Prior Publication Data

US 2011/0203161 A1   Aug. 25, 2011

Related U.S. Application Data

(60) Provisional application No. 61/307,172, filed on Feb. 23, 2010.

(51) Int. Cl.
*A01M 17/00* (2006.01)
*A01C 23/02* (2006.01)
*A01M 21/04* (2006.01)

(52) U.S. Cl.
CPC ............ *A01M 21/043* (2013.01); *A01C 23/028* (2013.01); *A01M 17/002* (2013.01); *Y10S 43/90* (2013.01)
USPC ............... 43/132.1; 43/124; 43/900; 47/57.5; 239/754

(58) Field of Classification Search
CPC ........................... A01M 1/2038; A01M 17/002
USPC ........... 43/124–125, 132.1, 900; 47/1.7, 48.5, 47/57.5; 239/146, 147, 754, 532, 416.4, 239/416.5, 423

IPC .................................. A01M 1/20, 17/00, 13/00
See application file for complete search history.

(56) References Cited

U.S. PATENT DOCUMENTS 2,841,923 A   7/1958   Dickison
3,012,526 A   12/1961  Baldwin et al.
(Continued)

FOREIGN PATENT DOCUMENTS

DE   831784   2/1952
EP   084486   7/1983
(Continued)

OTHER PUBLICATIONS

University of Arizona, Termite Management for Homeowners, Dec. 23, 2005.*

(Continued)

*Primary Examiner* — Darren W Ark
*Assistant Examiner* — Timothy Schwarz
(74) *Attorney, Agent, or Firm* — Armstrong Teasdale LLP

(57) ABSTRACT

A high pressure injection system for applying a pesticide includes a portable, handheld application tool and a manifold head connected to the application tool. The manifold head has at least one internal passage. At least one high pressure nozzle is positioned in the manifold head and in fluid communication with the at least one internal passage. The at least one high pressure nozzle is operable at pressures between about 25 psi and about 10,000 psi. A contact plate is mounted to the manifold head and has at least one opening aligned with the at least one high pressure nozzle. A source of pesticide is fluidly connected to the at least one high pressure nozzle. A discharge valve is moveable between a closed position wherein the pesticide is inhibited from flowing to the at least one high pressure nozzle and an opened position wherein pesticide flows to the at least one high pressure nozzle.

44 Claims, 7 Drawing Sheets

(56) References Cited

U.S. PATENT DOCUMENTS

| | | |
|---|---|---|
| 3,029,756 A | 4/1962 | Krivda |
| RE25,307 E | 12/1962 | Johnston |
| 3,405,669 A | 10/1968 | Nimrick |
| 3,435,785 A | 4/1969 | Harbolt |
| 3,521,819 A | 7/1970 | Johnston |
| 3,538,867 A | 11/1970 | Every et al. |
| 3,589,054 A | 6/1971 | Pascucci |
| 3,598,323 A | 8/1971 | Johnston et al. |
| 3,815,525 A | 6/1974 | Kainson et al. |
| 3,875,876 A | 4/1975 | Pustovoit et al. |
| 4,009,666 A | 3/1977 | Russell et al. |
| 4,624,193 A | 11/1986 | Johnston |
| 4,807,544 A | 2/1989 | Cross et al. |
| 4,907,516 A | 3/1990 | Rogers |
| 5,092,362 A | 3/1992 | Yie |
| 5,101,745 A | 4/1992 | Podevels et al. |
| 5,117,872 A | 6/1992 | Yie |
| 5,119,744 A | 6/1992 | Comer |
| 5,186,393 A | 2/1993 | Yie |
| 5,207,168 A | 5/1993 | Comer |
| 5,241,986 A | 9/1993 | Yie |
| 5,291,842 A | 3/1994 | Sallstrom et al. |
| 5,297,777 A | 3/1994 | Yie |
| 5,322,418 A | 6/1994 | Comer |
| 5,370,069 A | 12/1994 | Monroe |
| 5,394,812 A | 3/1995 | Dunning et al. |
| 5,487,346 A | 1/1996 | Taylor |
| 5,503,091 A | 4/1996 | Foster et al. |
| 5,524,821 A | 6/1996 | Yie et al. |
| 5,575,224 A | 11/1996 | Rogers |
| 5,605,105 A | 2/1997 | Clark et al. |
| 5,653,292 A | 8/1997 | Ptacek et al. |
| 5,741,090 A | 4/1998 | Dunning et al. |
| 5,983,559 A | 11/1999 | Manabe |
| 6,142,084 A | 11/2000 | Hatl |
| 6,293,498 B1 * | 9/2001 | Stanko et al. ............. 244/134 R |
| 6,431,096 B1 | 8/2002 | Engelke et al. |
| 6,722,298 B2 | 4/2004 | Engelke et al. |
| 6,860,336 B2 | 3/2005 | Robillard |
| 6,892,657 B2 | 5/2005 | Engelke et al. |
| 6,939,085 B1 | 9/2005 | Posch |
| 7,581,684 B2 | 9/2009 | Des Garennes et al. |
| 2008/0048049 A1 * | 2/2008 | Adams et al. ................ 239/146 |

FOREIGN PATENT DOCUMENTS

| | | |
|---|---|---|
| WO | 0124605 A1 | 4/2001 |
| WO | 2008000970 A1 | 1/2008 |

OTHER PUBLICATIONS

Internet Archive Wayback Machine, http://cals.arizona.edu/pubs/insects/az1356.pdf, providing the date for the University of Arizona "Termite Management for Homeowners" electronic publication.*
International Search Report and Written Opinion for PCT/US2011/025908, dated Jun. 9, 2011.
International Search Report and Written Opinion for PCT/US2011/025919, dated Jun. 16, 2011.

* cited by examiner

HIGH PRESSURE INJECTION SYSTEM FOR APPLYING A PESTICIDE BENEATH THE SURFACE OF THE GROUND

CROSS REFERENCE TO RELATED APPLICATION

This application claims priority to U.S. Provisional Patent Application Ser. No. 61/307,172, filed on Feb. 23, 2010, which is incorporated herein by reference in its entirety.

BACKGROUND OF THE DISCLOSURE

The field of the disclosure relates generally to soil treatments, and more particularly to methods for applying pesticides below the ground surface using a handheld application tool that can be positioned adjacent to structures, in a manner which does not disturb the soil surface before the pesticide is injected.

The insertion of soil treatments into the soil near buildings has been used to prevent or reduce the infestation of insects or other pests. Without treatment, these pests can be become a significant nuisance or hazard to a building owner or its occupants. Such pests are known to attack the structure of buildings and may infiltrate the building causing other problems for its occupants.

At least one known method of soil treatment includes an application of pesticides, fertilizers, or other soil treatments by direct placement into the soil under and around structures, around or near ornamental plantings, poles, fences, decks, or other wooden elements. This direct placement method includes digging, trenching and/or rodding (i.e., forcing an application device into the soil), and then directly placing the soil treatment into the dug out area of the trench. This known method can cause damage to vegetation, disrupt landscaping, and greatly impact or diminish the aesthetic beauty and value of the treated area until either the plants recover or new plantings are installed.

For example, in some common termite treatments direct placement of a termiticide into the soil around structures involves the digging of a trench approximately 4 to 6 inches wide by 6 inches deep into which a termiticide composition is applied at a rate of 4 gallons per 10 linear feet of trench per foot of depth. In addition to the application of the soil treatment to the trench, soil treatment may also be dispensed into the ground through the use of a rod injection tool, which is plunged down into the ground or in the top of a footer (i.e., a part of the building's foundation). For a typical structure having a perimeter of 200 linear feet, the time to prepare, dig, inject, and finish the application of soil treatment requires at least 4 to 6 hours depending on the type of soil and whether the application is conducted by a pair of or a single technician (s).

Another known method of soil treatment includes the direct insertion of a tool down into the ground and delivering the pesticides, fertilizers, or other soil treatments into the ground Applying the soil treatments below the surface of the soil has been used as a way of limiting the wash off of the treatments. Typical devices for implementing such soil treatments have utilized needles or other mechanical devices to create a passageway into the soil to allow the soil treatment to be inserted into the ground. These devices have the obvious limitation that they create holes in the soil, which may be unsightly, or create other adverse concerns, such as unwanted soil compaction adjacent the insertion sights, as well as require the creation of the hole using mechanical forces.

The use of high pressure flows as a method of effectively injecting materials below the soil surface has been described before, such as in U.S. Pat. No. 5,370,069 to Monroe, titled Apparatus and Method for Aerating and/or Introducing Particulate Matter into a Ground Surface. These methods use high pressure jets of a fluid, such as air or water that entrain the soil treatment agent, whether the soil treatment agent is in solution with the fluid, or a granular material carried with the fluid. The high pressure jet can form a small hole in the surface into which the material is being placed, or cause the material to be absorbed by the surface in a rapid fashion, such that soil disturbance is minimal. One benefit of the use of a pressure jet is that no mechanical effort is required to create a passageway as a predicate for the soil treatment material to be placed below the surface of the soil. Nor is any other disturbance of the soil required, such as placing a tool directly down below the ground surface.

While devices such as that disclosed in Monroe are effective at placing soil treatment materials below the surface, they are designed to distribute such materials both a short distance below the soil surface and over a large open space area, where the size of the equipment is not a limitation. These known devices are not suitable for strategically injecting soil treatments into the soil under and around structures, ornamental plantings, poles, fences, decks and other wood elements where treatments relating particularly to treatments against insects infestation are common.

Accordingly, a handheld high pressure application tool for applying a termiticide or other pesticide beneath the surface of the ground adjacent a structure is needed. Such a handheld tool would permit an operator to strategically position the tool around a structure such as a house, a deck, any landscaping that may be near the house and/or deck, around utility poles, and around plants. The tool could include multiple nozzles for applying a predetermined amount of pesticide at a controlled pressure for injecting the pesticide down to a desired predetermined depth.

BRIEF DESCRIPTION OF THE DISCLOSURE

In one aspect, a high pressure injection system for applying a pesticide generally comprises a portable, handheld application tool and a manifold head connected to the application tool. The manifold head has at least one internal passage. At least one high pressure nozzle is positioned in the manifold head and in fluid communication with the at least one internal passage. The at least one high pressure nozzle is operable at pressures between about 25 psi and about 10,000 psi. A contact plate is mounted to the manifold head and has at least one opening aligned with the at least one high pressure nozzle. A source of pesticide fluidly is connected to the at least one high pressure nozzle. A discharge valve is moveable between a closed position wherein the pesticide is inhibited from flowing to the at least one high pressure nozzle and an opened position wherein pesticide flows to the at least one high pressure nozzle.

In another aspect, a portable handheld application tool for a high pressure injection system for applying pesticide generally comprises a handle and a manifold head connected to the handle. The manifold head has at least one internal passage. At least one high pressure nozzle is positioned in the manifold head and fluidly connected to the at least one internal passage. The at least one high pressure nozzle is operable at pressures of about 25 psi to about 10,000 psi. A contact plate is mounted to the manifold head and has at least one opening aligned with the at least one high pressure nozzle. A source of pesticide is fluidly connected to the at least one high pressure nozzle. A discharge valve is moveable between a closed position wherein the pesticide is inhibited from flowing to the at least one high pressure nozzle and an opened position wherein pesticide flows to the at least one high pressure nozzle.

In still another aspect, a high pressure injection system for applying a pesticide generally comprises portable, handheld application tool. A manifold head having at least one internal passage is connected to the application tool. At least one nozzle is positioned in the manifold head and in fluid communication with the at least one internal passage. A contact plate is mounted to the manifold head. The contact plate has at least one opening aligned with the at least one nozzle. A high pressure source of pesticide is fluidly connected to the at least one nozzle. The high pressure source is between about 25 psi and about 10,000 psi. A discharge valve is moveable between a closed position wherein the pesticide is inhibited from flowing from the high pressure source to the at least one nozzle and an opened position wherein pesticide flows from the high pressure source to the at least one high pressure nozzle.

DETAILED DESCRIPTION OF THE DISCLOSURE

Figure 1:
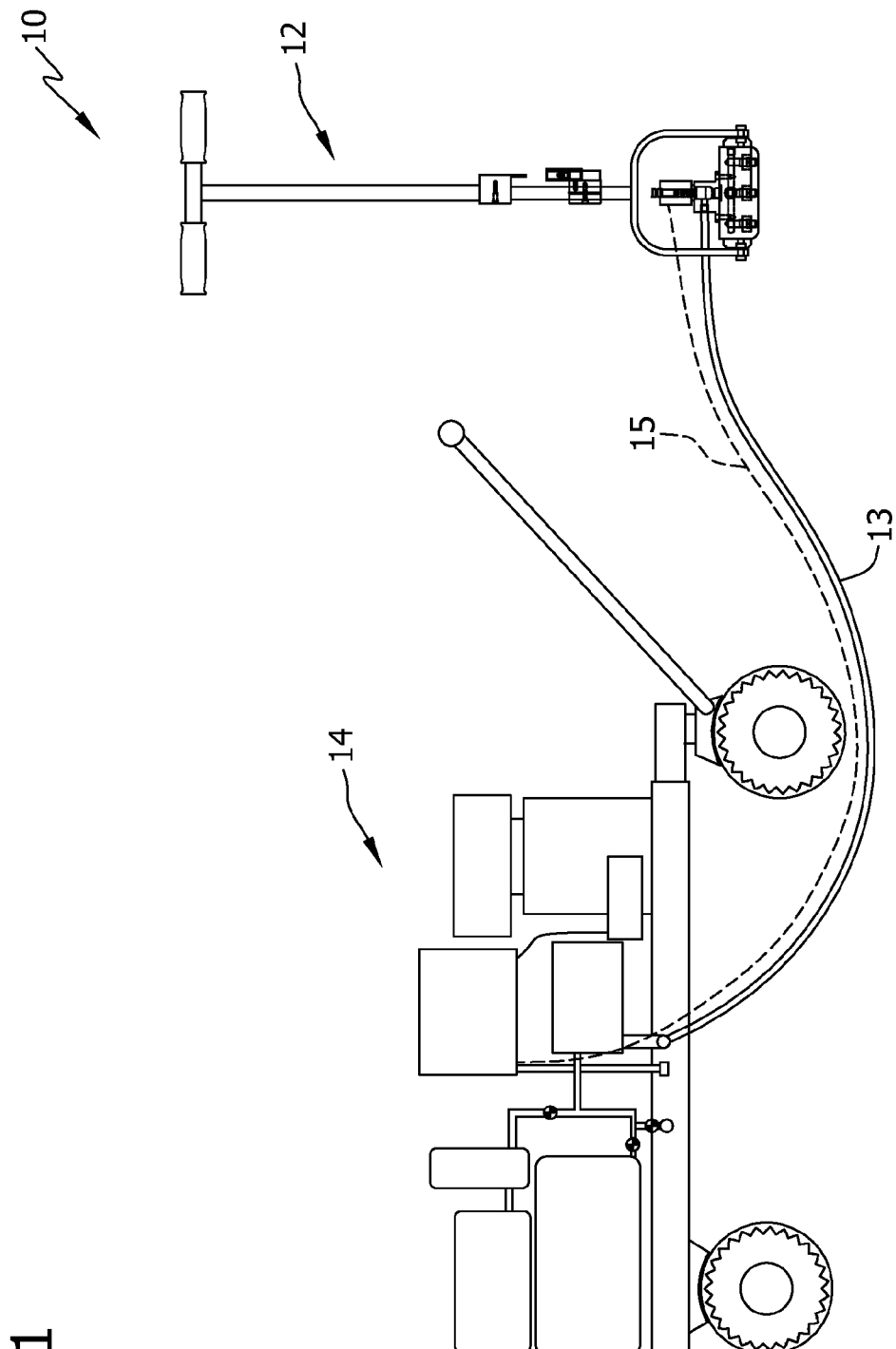
FIG. 1 is a schematic illustration of a high pressure injection system for injecting a termiticide into the ground in accordance with an exemplary embodiment in which the system includes a base unit and a handheld application tool.

A high pressure injection system for applying a pesticide, insecticide or termiticide beneath the surface of the ground is described below in detail. It is understood that the system disclosed herein can be used to apply any suitable pesticide, insecticide, or termiticide and can be used to inhibit or control various types of pests. For example, it may be desirable to inhibit and/or control termites, ants, cockroaches, beetles, earwigs, silverfish, crickets, spiders, centipedes, millipedes, scorpions, pillbugs, sowbugs, flies, mosquitoes, gnats, moths, wasps, hornets, bees, and the like. As used herein, the term "pesticide" refers to any substance or mixture for preventing, destroying, repelling, or mitigating any pest including insects, animals (e.g., mice, rats), plants (e.g., weeds), fungi, microorganisms (e.g., bacteria and viruses), pseudocoelomates (e.g., nematodes) and prions. The term "insecticide", which is a type of pesticide, is used herein to mean any substance or mixture for preventing, destroying, repelling, or mitigating insects. The term "termiticide", which is a type of insecticide, is used herein to mean any substance or mixture for preventing, destroying, repelling, or mitigating termites.

Although the methods and systems described herein relate to the application of termiticides beneath the surface of the ground, the methods and systems could also be used to apply pesticides, insecticides, termiticide, or other soil treatments. The use of termiticides as described herein is not intended to be limiting in any way. Rather, it is for exemplary purposes. The methods and systems described herein may be used, therefore, to apply any type of soil treatment beneath the ground (e.g., pesticides, fertilizers, other soil conditioning materials and insect treatments including insecticides placed around the perimeter of a structure), and is in no way limited to only termiticides.

The methods and systems described herein include a termiticide fluid supply cart (a base unit), and a portable handheld application tool that facilitates the application or injection of termiticides into the soil under and around structures, ornamental plantings, poles, fences, decks and other wood elements. The example embodiment eliminates the need to apply termiticides using certain known techniques such as digging, trenching, and/or rodding, which all require mechanically disturbing at least the surface of the ground or soil. These known techniques can cause damage to vegetation, disrupt landscaping, and impact or diminish the aesthetic beauty and value of the treated area until the plants recover or new plantings are installed.

The application system described herein includes an application tool that has a tee-handle at the top of the tool and a manifold assembly at the bottom of the tool. The tee-handle includes a hand grip portion on each side of a vertical shaft that extends between the handle and the manifold assembly. The hand grip portions may include rubber grips to aid in holding the tool during application and to reduce hand strain. The vertical shaft of the tool consists of several parts that allow the shaft to compress, when the handle is pushed down, much like a pogo stick. The compression of the shaft activates an electronic triggering switch (broadly, "an actuator") that temporarily opens a discharge valve, for example a poppet. When the operator has the manifold assembly (i.e., device plate) in position on the ground, the operator uses the handle to apply a downward pressure (approximately 15-20 pounds) onto the shaft to actuate the trigger switch, which in turn causes a single injection of termiticide into the ground. The operator must release the pressure applied to the shaft to disengage the switch, which results in the system being reset.

In the example embodiment, the switch actuates the discharge valve a single time for each compression of the shaft. Thus, for each compression of the shaft, the discharge valve is opened a single time and a predetermined quantity of termiticide is discharged from the tool. The switch of tool is reset when the shaft is released. The next application can then be made by again compressing the shaft.

The application tool also includes a mounting bracket that mounts the manifold assembly to the shaft. This bracket allows the application head or manifold assembly to pivot about at least one axis. This allows the operator to adjust the tool such that the manifold assembly is properly positioned before activating the application switch.

The manifold assembly includes an inlet port, a discharge valve, a plurality of high pressure nozzles, a manifold head, and a contact plate for protecting the plurality of high pressure nozzles. The system also includes at least one high pressure liquid line and electrical connections that extend between the supply cart and the handheld application tool. The system also includes a pressure manifold and an electronic controller (broadly, "a valve closer") that sets the length of time the discharge valve remains open during each activation of the electronic switch.

In operation, a measured dose of a liquid termiticide concentrate from a container housed on the supply cart is mixed with measured supply of water and fed to the application tool by an inline injection system. In another embodiment, the termiticide solution is supplied to the application tool from a tank or container without the need of an inline injection pump or device. In yet another embodiment, the termiticide concentrate can be carried by the operator and housed in a transportable container formed into and/or held within a backpack, a shoulder holster, a sling, a belt holster, a leg holster, or other suitable device capable of holding the pesticide container.

The methods and systems described herein utilize high pressure to inject the termiticide into soil beneath the surface of the ground. The high pressure injection system described herein differs from at least some known liquid injection systems that apply termiticides for soil application in that the current industry standard liquid termiticide injection systems inject liquids into the ground using pressures of 25 to 35 psi and through a single injection port or tip. The example system described herein injects the termiticide solution into the ground at pressures ranging from about 50 psi to about 10,000 psi, and in another embodiment, from about 1,000 psi to about 7,000 psi, and in yet another embodiment, at about 4,000 psi.

In operation, the application tool is set at a desired pressure for applying the termiticide. The operator then places the manifold assembly, and more specifically, the contact plate, which protects the injection nozzles, in a desired application area. The desired area may be adjacent to a wall or foundation of a structure. The operator then press down on the application handles to compress the shaft of the tool. This downward pressure causes the upper and lower portions of the device shaft to come together thereby activating an electronic switch. The switch would temporarily open the discharge valve and allow a predetermined amount of termiticide solution to pass through the high pressure injection nozzles and into the ground. The switch would only allow a single charge (i.e., a predefined amount of termiticide solution) to pass through the nozzles. The switch is reset by releasing the pressure on the handle and allowing the two parts of the electronic switch to separate. The operator applicator would then lift or slide the handheld application tool along the wall to the next application point and press down on the handle again, thus repeating the injection of the termiticide solution into the soil. The operator continues to move the handheld application tool and inject termiticide until the desired application is area is injection. In one example, the desired application area is the perimeter of the structure so that a barrier of termiticide completely surrounds the structure and thereby inhibits termites from passing through the barrier to the structure.

In an alternative embodiment, the electronic switch could be positioned on or near the tee-handle portion of the tool where it could be activated by the operator pressing down on a button or switch with a finger or thumb. In another embodiment, the tool could include a position marker, such as a foam, dust, powder, paint, or a dye material that would be applied when the termiticide is applied. The position marker would apply a marking material to the ground to mark the position of the contact plate during each application. This would allow the operator to visually determine where an application has been made and where the device plate should be re-positioned to ensure that a continuous application of the termiticide is made around the perimeter of the structure. The marker would also aid in preventing over or under application of the termiticide solution in the application area.

The high-pressure application tool and methods of using the same as described herein have many advantages over the known systems. For example, the tool described herein may include an inline injection assembly which eliminates the need to mix large volumes of the termiticide solution, and reduces the hazards associated with transporting or handling large volumes of termiticide solutions on public roadways or on private property. The use of the high-pressure injection tool also eliminates the need for digging (i.e., trenching) before applying the termiticide solution into the ground. This reduces the destruction of the landscaping and/or natural vegetation around the perimeter of a structure being treated. The high-pressure injection tool also reduces or eliminates the need for rodding into the soil with an application device in order to apply the termiticide solution. The high-pressure tool can also be programmed to deliver a specific volume of termiticide solution per nozzle, and control the depth to which the solution penetrates into the soil by controlling the application pressure. By controlling the volume and the pressure, the application volume of the termiticide can be reduced by 25% to 80% of a normal liquid termiticide application, thus saving cost and reducing demands on water. This is especially important in drier climates or during times of drought. The high-pressure tool also greatly reduces the time required to complete a termiticide treatment around a structure. This reduction in time can range between 40% and 80%. As a result, less time is spent at the site and thereby labor costs associated with the site preparation and application are reduced. Also, the application tool, which is designed to place the injection nozzles in close proximity to the ground when injecting the termiticide into the ground, reduces the risk of exposure to the operator or anyone in the immediate area of the application.

Referring to the drawings, FIG. 1 is a schematic illustration of a high pressure injection system 10 for injecting termiticide into the ground in accordance with an exemplary embodiment of the present invention. The injection system 10 includes a handheld portable application tool 12 (broadly, an "injection apparatus") and a termiticide fluid supply cart 14 (broadly, a "base unit"). The application tool 12 is connected to the cart 14 via a conduit 13 defining a fluid passageway (e.g., a hose) and at least one electrical connection 15. The conduit 13 permits fluid (e.g., water and/or a termiticide solution) to flow from the cart 14 to the application tool 12. The electrical connection 15 is used for transmitting various control signals between the application tool 12 and the cart 14.

Figure 2:
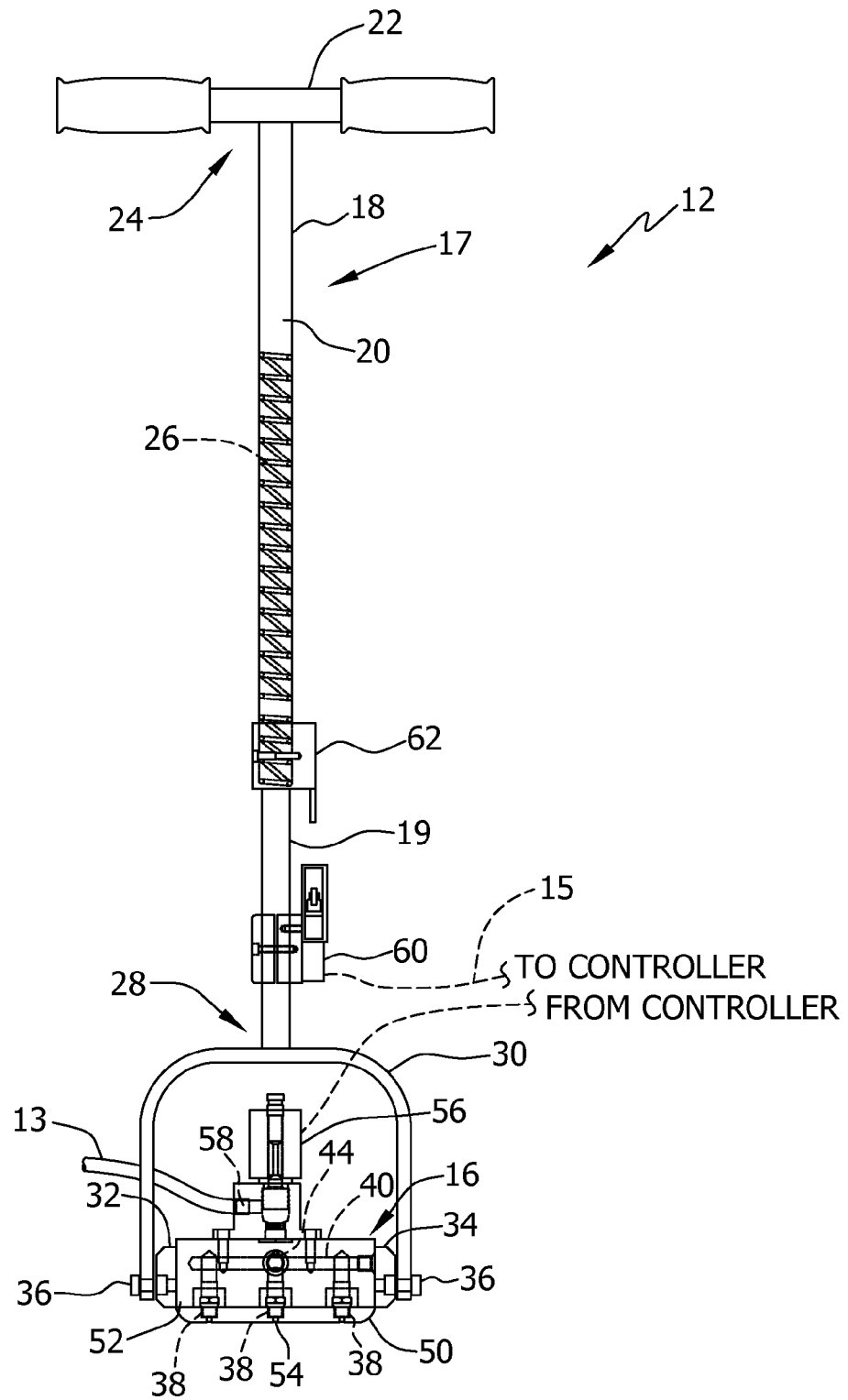
FIG. 2 is a front view schematic illustration of the handheld portable application tool of FIG. 1 with parts cut away.
Figure 3:
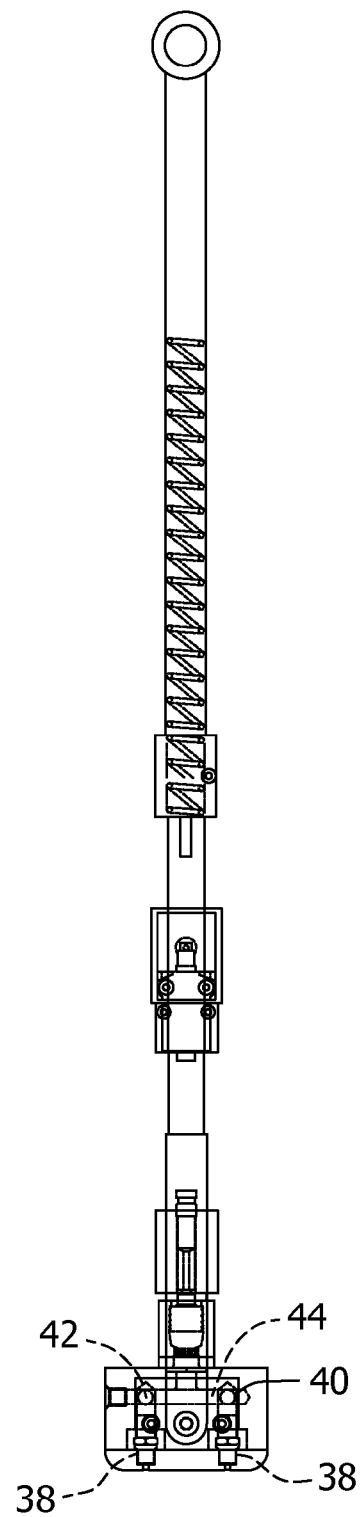
FIG. 3 is a side view schematic illustration of the handheld portable application tool of FIG. 2.

FIG. 2 is a front view schematic illustration of the handheld portable application tool 12, and FIG. 3 is a side view schematic illustration of the application tool 12. The handheld portable application tool 12 includes a handle 17 and a manifold head 16 mounted to the handle. The handle 17 includes an upper portion 18 and a lower portion 19. The upper portion 18 includes a tubular section 20 and a hand grip section 22 attached to an upper end 24 of the tubular section 20. As a result, the upper portion 18 of the handle 17 has a generally T-shape. The lower portion 19 of the handle 17, which is tubular, is sized for insertion into the tubular section 20 of the upper portion 18 of the handle. With the lower portion 19 of the handle 17 inserted into the tubular section 20 of the upper portion 18 of the handle, the upper portion can move with respect to the lower portion from a first, extended position to a second, compressed position. A biasing element, such as a spring 26, is provided to bias the upper portion 18 of the handle 17 toward its first, extended position. It is understood, however, that any known biasing element 26 may be used. A flange (not shown) or other suitable retainer(s) may be provided to inhibit the lower portion 19 of the handle 17 from being pulled or otherwise withdrawn from the upper portion 18 to thereby ensure that the lower portion remains telescopically attached to the upper portion. A lower end 28 of lower portion 19 of the handle 17 is attached to an inverted U-shaped attachment bracket 30. The manifold head 16 is pivotally attached at each of its ends 32, 34 to the attachment bracket 30 via a pair of pivot pins 36.

The manifold head 16 includes at least one internal passage to distribute the termiticide to a plurality of high pressure nozzles 38 in fluid communication with the internal passage. As seen in FIG. 3, the illustrated manifold head 16 includes two main internal passages 40, 42, and a cross passage 44 connecting main internal passages. It is contemplated that the manifold head 16 may include any number of high pressure nozzles 38 including a single nozzle. For example, the manifold head 16 of the exemplary embodiment has a matrix of six high pressure nozzles 38 with each nozzle generally equidistant from each other. Each of the high pressure nozzles 38, in one embodiment, has an orifice diameter ranging from about 0.002 inch to about 0.01 inch.

With reference again to FIG. 2, a contact plate 50 is attached to a bottom surface 52 of the manifold head 16 to protect the high pressure nozzles 38. In the illustrated embodiment, the contact plate 50 includes a plurality of openings 54 with each of the openings being generally aligned with a respective one of the plurality of high pressure nozzles 38. As a result, the high pressure nozzles 38 are spaced from the soil by the contact plate 50 and therefore do not directly contact the soil. Moreover, the contact plate 50 shields or otherwise blocks soil, rocks, and/or other debris that may be "kicked-up" during the injection of the termiticide. The contact plate 50 includes rounded edges to facilitate sliding of the tool 12. The contact plate 50 can be made from any suitable material, for example, metal and/or plastic.

Figure 4:
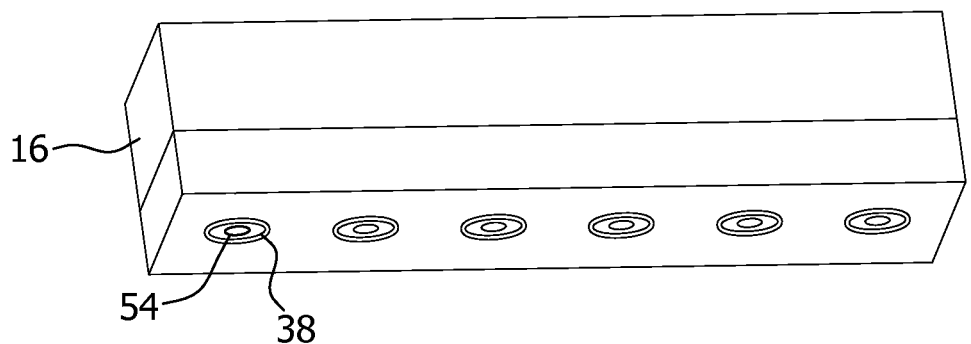
FIG. 4 is a perspective schematic illustration of an elongated shaped manifold head for use with the application tool.
Figure 5:
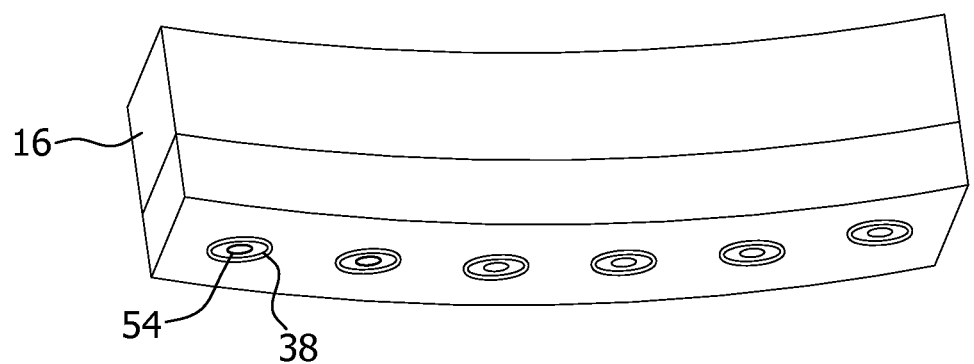
FIG. 5 is a perspective schematic illustration of an arcuate shaped manifold head for use with the application tool.

The size and shape of the manifold head 16 may be selected based on the particular application for which the tool 12 is intended to be used. In one embodiment, the manifold head 16 has a shape with a high length to width ratio such as the high pressure nozzles 38 being arranged linearly in a row as shown in FIG. 4. In another embodiment, the manifold head 16 has an arcuate shape as shown in FIG. 5. The arcuate shaped manifold head 16 may be used to conform around circular edges, such as around trees. It is contemplate that the manifold heads 16 can be interchangeable. That is, the operator of the tool 12 can selectively change out the manifold head 16. It is also contemplates that the manifold head 16 can be replaced with other delivery means (e.g., a rod injection tool) for delivering a supply of termiticide at low pressures. These low pressure delivery means can be used in areas less suitable for high pressure injection.

The weight of the manifold head 16 may be selected so that the mass of the manifold head 16 assists in retaining tool 12 in position during a discharge from the plurality of high pressure nozzles 38, without being unduly burdensome for manual positioning and moving the tool by an operator. In general, the lighter the mass of the manifold head 16, the greater the force that the operator must apply to the handle 17 to retain the tool 12 in position during a discharge of termiticide from the high pressure nozzles 38.

As illustrated in FIG. 2, a discharge valve 56 is attached to the manifold head 16 and is in fluid communication with the internal passages 40, 42, 44 in the manifold head and the supply of termiticide. More specifically, one end of the discharge valve 56 is coupled to a high pressure inlet port 58 and the other end of the discharge valve is coupled to the hose 13.

The discharge valve 56 is moveable between an opened position and a closed position. When the discharge valve is in its closed position, termiticide is inhibited from flowing from the supply of termiticide via the hose 13 to the internal passages 40, 42, 44 in the manifold head via the high pressure inlet port 58. When the discharge valve 56 is opened, the termiticide solution flows from the supply of termiticide through the hose 13 and into inlet port 58 under high pressure. From the inlet port 58, the pressurized termiticide flows into internal passages 40, 42, 44 of the manifold head 16 and through the high pressure nozzles 38 from which the termiticide is injected into the ground. In one embodiment, the termiticide is pressurized to a pressure of about 25 psi to about 10,000 psi, and in another embodiment, from about 1,000 psi to about 7,000 psi, and in yet another embodiment, at about 4,000 psi.

In one suitable embodiment, the discharge valve 56 is a solenoid operated poppet valve capable of sufficiently rapid operation to allow opening and closing of the discharge valve 56 within the desired time parameters to allow correct depth penetration of the soil based on the pressure in use and correct volume of termiticide solution for the specific application. While it is possible to use a hydraulically actuated valve, the size and weight constraints of such a valve may otherwise limit the utility of the handheld application tool 12.

In another suitable embodiment, the manifold head 16 may have a discharge valve 56 associated with each of the high pressure nozzles 38, such that even distribution of termiticide fluid across the plurality of high pressure nozzles 38 may be ensured. While discharge balancing can be obtained within reasonable parameters simply through proper sizing of the internal passages 40, 42, 44, should it be required, and should it justify the expense, multiple discharge valves 56 may be used, such that pressurized termiticide solution contained in a feed hose supplying each of the discharge valves 56 may provide that an adequate amount of termiticide solution is available for each of the high pressure nozzle 38. Such a configuration, however, adds complexity to the system 10 in that the controller must be able to actuate the multiple discharge valves 56 in response to a single actuation, i.e., increasing the amount of wiring and power required to control the valves, although the power requirement may be offset by the use of smaller discharge valves 56.

As illustrated in FIG. 2, a trigger switch 60 (broadly, an "actuator") is mounted on the lower portion 19 of the handle 17 and a trigger switch actuator 62 is mounted on the upper portion 18. The trigger switch 60, which is electrically coupled to the discharge valve 56, activates the discharge valve 56 when the trigger switch actuator 62 engages the trigger switch 60. In the illustrated embodiment and as seen in FIG. 3, the trigger switch actuator 62 is engaged with trigger switch when the upper portion 18 of the handle 17 is moved to its second, compressed position. Thus, the trigger switch 60 can be actuated by moving the upper portion 18 of the handle 17 from its first, expanded position to its second compressed position by applying a force on the upper portion so that it slides downward relative to the lower portion 19 of the handle until the trigger switch actuator engages the trigger switch 60.

In another embodiment (not shown), the trigger switch 60 can be located on the hand grip section 22 of the upper portion 18 of the handle 17 where it can be actuated by the operator using a finger or thumb. The trigger switch may be a mechanical device, which interrupts the flow of termiticide from the discharge valve 56 to the high pressure nozzles 38, or may be an electrical switch which interrupts the electrical signal to the discharge valve 56, thus preventing actuation of the discharge valve 56.

To inject the termiticide into the ground, the operator positions handheld portable application tool 12 such that the contact plate 50 is in contact with the surface of the ground. A downward force between about 15 to 20 pounds is applied by the operator to the upper portion 18 of the handle 17 to move the upper portion 18 from its first position to its second position and thereby cause the trigger switch actuator 62, which is mounted to the upper portion, to engage the trigger switch 60, which is mounted to the lower portion 19. Engagement of the trigger switch actuator 62 and the trigger switch 60 actuates the trigger switch 60. As a result, an electronic signal is sent from the trigger switch 60 to the discharge valve 56 causing the discharge valve to move from its closed position to its opened position for a predetermined amount of time thereby permitting termiticide to flow to and out the high pressure nozzles 38 for injecting the termiticide into the ground. The operator then releases the pressure from the handle 17, which resets the trigger switch. More specifically, the spring 26 causes the upper portion 18 of the handle 17 to move back to its first, extended position. The illustrated trigger switch 60 is configured to work only once during each compression of handle 17 to prevent repeated opening of the discharge valve 56 until the handle 17 has been reset.

The depth of penetration of the termiticide solution into the ground is a function of the pressure at which the termiticide solution is discharged from the tool 12 and the type of soil into which the termiticide is discharged. For example, hard packed or compacted soil, such as clay, is harder to penetrate and may require higher pressures than a soft sandy soil. Thus, at a given pressure the penetration of termiticide into a sandy soil may be about 12 to 14 inches, while the penetration of termiticide into a sandy loam at the same pressure may be about 6 to 9 inches, and the penetration of termiticide into a clay soil at the same pressure may be about 2 to 5 inches.

Figure 6:
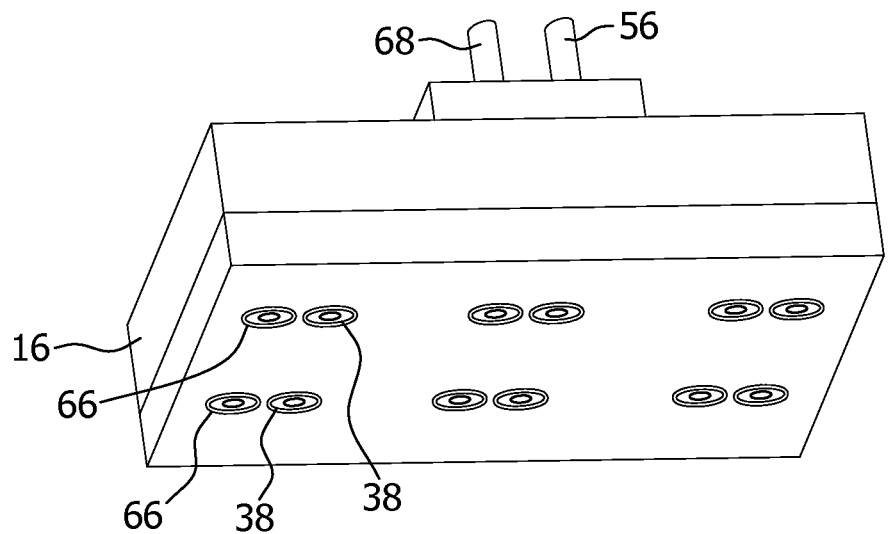
FIG. 6 is a perspective schematic illustration of the manifold head shown in FIG. 2 having low pressure nozzles positioned adjacent to high pressure nozzles.
Figure 7:
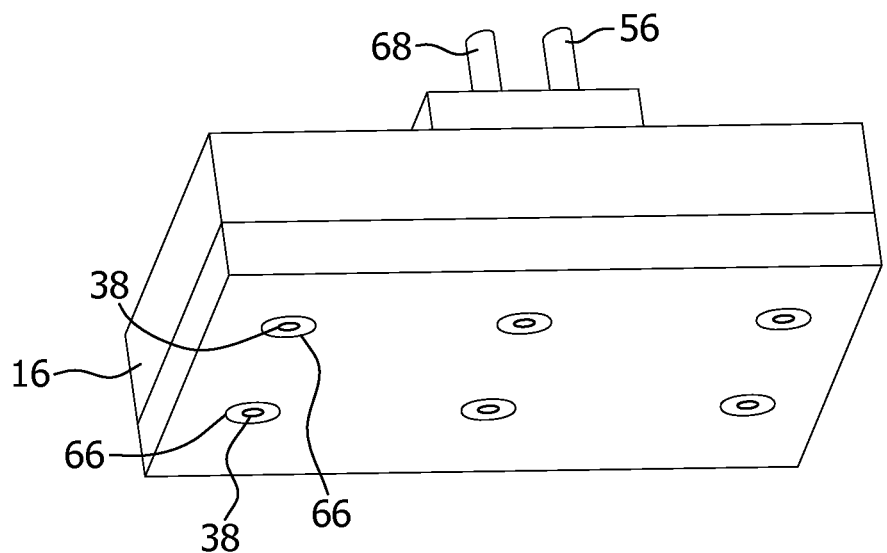
FIG. 7 is a perspective schematic illustration of the manifold head shown in FIG. 2 having low pressure nozzles concentric with high pressure nozzles.

Referring also to FIGS. 6 and 7, the manifold head 16 may also include a plurality of the low pressure nozzles 66. In the illustrated embodiment of FIG. 6, each of the lower pressures nozzles 66 positioned adjacent to one of the plurality of high pressure nozzles 38. In another embodiment, which is illustrated in FIG. 7, each of the low pressure nozzles 66 is concentric with one of the high pressure nozzles 38. The low pressure nozzles 66 apply the termiticide solution onto the surface of the ground when a low pressure discharge valve 68 is opened. The lower pressure discharge valve operates in the same manner as the previously described discharge valve 65. The low pressure nozzles 66 are configured to apply the termiticide solution to the ground at a pressure of less than about 35 psi.

Figure 8:
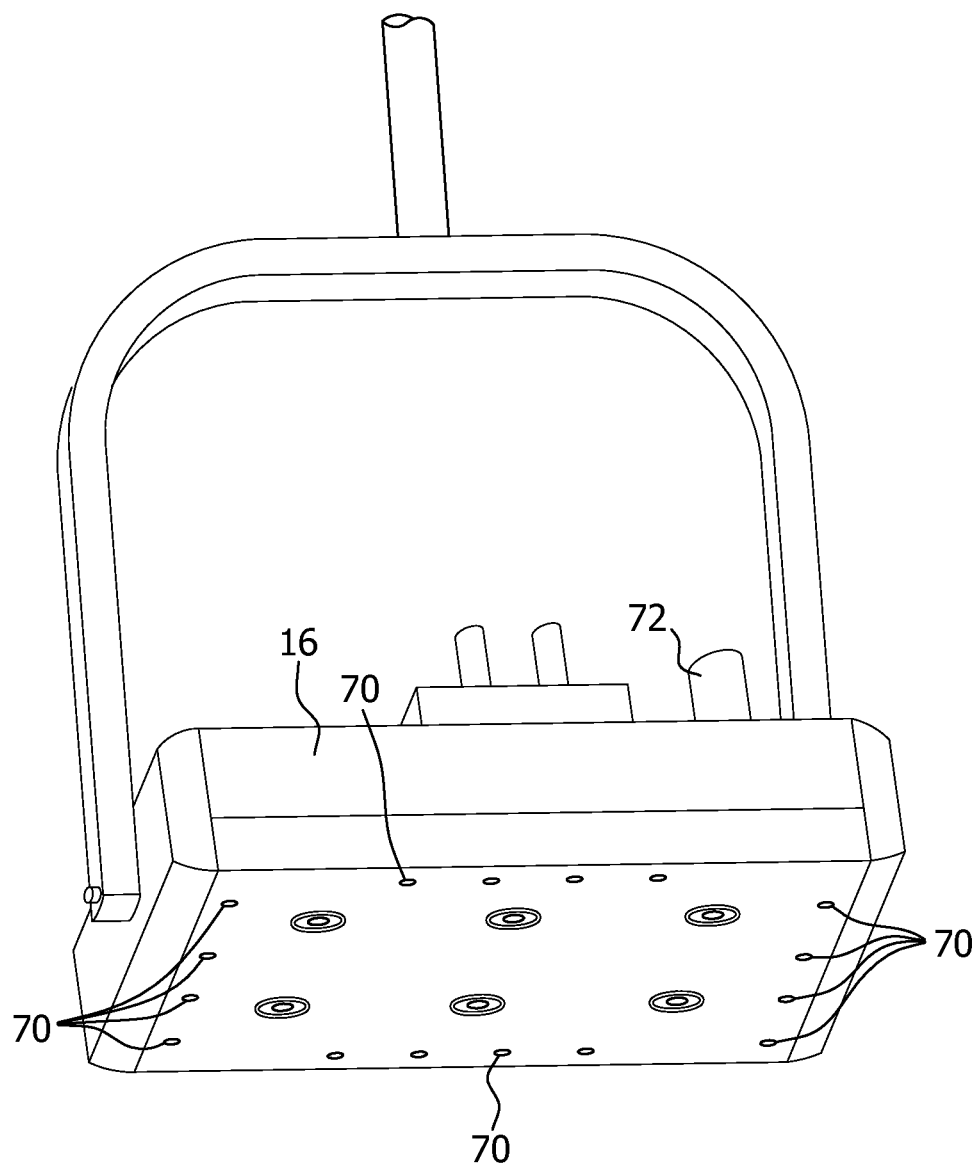
FIG. 8 is a bottom schematic illustration of the manifold head shown in FIG. 2 having nozzles on the perimeter for applying marking materials.
Figure 9:
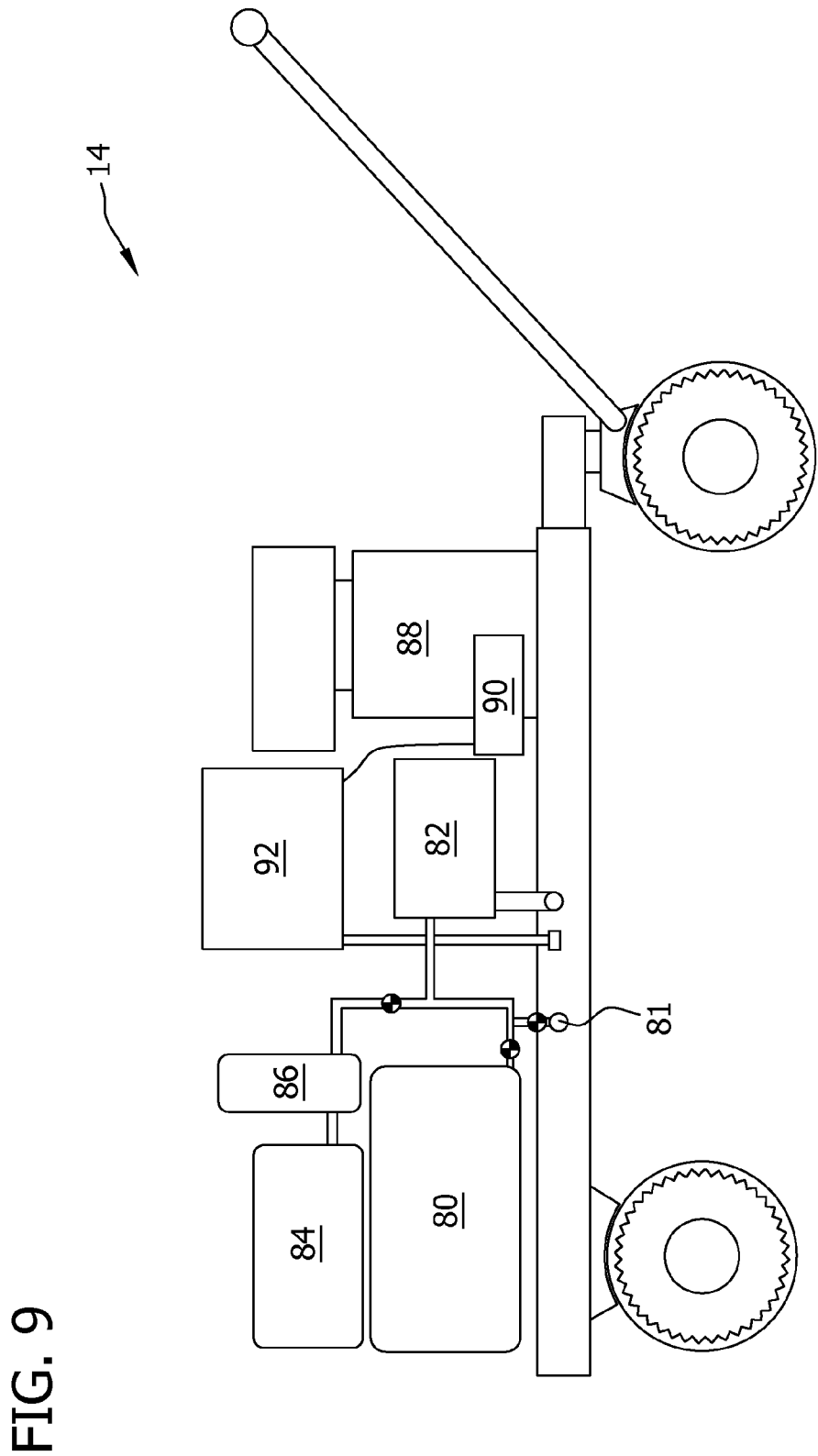
FIG. 9 is a side view schematic illustration of the base unit shown in FIG. 1.

Referring now to FIG. 8, the handheld portable application tool 12 may also include a plurality of nozzles 70 (broadly, a "dispenser") for depositing position marker material onto the surface of the soil to indicate an area in which the termiticide has been injected, and marking the position of the manifold head 16 during each application. Marking the position of the manifold head 16 permits the operator to visually observe where termiticide has been applied and to where the manifold head should be positioned next so that a uniform application of the termiticide can be applied around the perimeter of a structure. In addition, the applied marking material may also aid in preventing over and/or under application of the termiticide. Any suitable marking material may be used, for example, a foam, a powder, a paint, and a dye. In the illustrated embodiment, the marking material is applied by the plurality of nozzles 70 about the circumference of the manifold head 16. A container 72 containing the marking material may be carried by the application tool 12 or a remotely located device such as the cart 14 shown in FIG. 1. It is understood that the marking material may be applied by any suitable delivery device and remain within the scope of this invention.

The supply of termiticide solution may be provided by the supply cart 14. In one embodiment, the cart 14 includes a water reservoir 80, a high pressure pump 82 for pressurizing the termiticide solution, a termiticide concentrate reservoir 84, and a mixing device 86 that supplies the appropriate amount of termiticide concentrate to be mixed with the appropriate amount of water to form the termiticide solution. A water inlet 81 for receiving water from an external water source (e.g., a standard residential water spigot) is also provided. It is contemplated that either the water reservoir 80 or the water inlet 81 can be omitted. The supply cart 14 also includes a gasoline engine 88 with a generator 90 for generating power for operating the pressure pump 82 and generating electrical current for operating a controller 92 associated with the tool 12. In another embodiment, electrical power can be supplied by connecting into an electrical outlet located at the application site.

It is contemplated that the supply cart 14 may be vehicle mounted (e.g., a truck, a van, a ATV), trailer mounted, self propelled, or even a combination thereof, such that the cart 14 can be towed to a job site, then moved around a location under its own power. It is also contemplated that some the various components of the system 10 described herein as being mounted on the supply cart 14 may be mounted on the application tool 12. For example, it is contemplated that the termiticide concentration reservoir 84 and the mixing device 86 can be mounted on the application tool 12 instead of the supply cart 14. It is further contemplated that the supply cart 14 can be omitted. In such an embodiment, at least the termiticide concentration reservoir 84, the mixing device 86, and the water inlet 81 are carried on-board the application tool 12.

The controller 92, which is mounted on the cart 14, permits the operator of the system 10 to selectively set a pulse duration and pressure level for termiticide injections. The controller 92 may be programmable to permit the operator to enter parameters associated with a particular manifold head 16 in use, such as by defining the number of orifices and their sizes, parameters with a termiticide solution in use, such that dosing through the mixing device 86 can be properly controlled, or the number of injections can be tracked, and the like.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A high pressure injection system for applying a pesticide, the system comprising:
    a portable, handheld application tool;
    a manifold head connected to said application tool, the manifold head having at least one internal passage;
    a plurality of high pressure nozzles positioned in said manifold head and in fluid communication with the at least one internal passage, the plurality of high pressure nozzles each being operable at pressures between about 25 psi and about 10,000 psi;

a contact plate mounted to the manifold head, the contact plate having a matrix of openings arranged such that at least two of the openings are spaced from each other both longitudinally and transversely with respect to the contact plate, each opening aligned with a respective one of the high pressure nozzles;

a source of pesticide fluidly connected to the plurality of high pressure nozzles; and a discharge valve moveable between a closed position wherein the pesticide is inhibited from flowing from the plurality of high pressure nozzles and an opened position wherein pesticide flows from the plurality of high pressure nozzles.

2. The system in accordance with claim 1 wherein the manifold head further comprises at least one low pressure nozzle operable at pressures below about 20 psi.

3. The system in accordance with claim 2 wherein the at least one low pressure nozzle is positioned adjacent the at least one high pressure nozzle.

4. The system in accordance with claim 2 wherein the at least one low pressure nozzle is concentric with one of the plurality of high pressure nozzles.

5. The system in accordance with claim 1 further comprising a dispenser for selectively depositing a marker material to indicate where the pesticide has been applied.

6. The system in accordance with claim 5 wherein the marking material comprises at least one of a foam, a powder, a paint, and a dye.

7. The system in accordance with claim 1 wherein the contact plate is a plastic material.

8. The system in accordance with claim 1 further comprising an actuator wherein actuation of the actuator by a user causes the discharge valve to move from the closed position to the opened position.

9. The system in accordance with claim 8 further comprising a valve closer, the valve closer being adapted to move the discharge valve from the opened position to the closed position.

10. The system in accordance with claim 9 wherein the valve closer is operable to close the discharge valve after a predetermined amount of pesticide has flowed from the plurality of high pressure nozzles.

11. The system in accordance with claim 9 wherein the manifold head further comprises at least one low pressure nozzle, the valve closer being operable to close the discharge valve after a predetermined amount of pesticide has flowed from the at least one low pressure nozzle.

12. The system in accordance with claim 1 wherein the portable handheld application tool comprises a handle having a upper portion and a lower portion, the upper portion being selectively moveable relative to the lower portion between a first position and a second position, a biasing member for biasing the upper portion toward the first position.

13. The system in accordance with claim 12 wherein the biasing member comprises a spring.

14. The system in accordance with claim 12 further comprising an actuator mounted on the handle, wherein actuation of the actuator by a user causes the discharge valve to move from the closed position to the opened position, the actuator being actuated by moving the upper portion of the handle from the first position to the second position.

15. The system in accordance with claim 14 wherein the actuator comprises a trigger switch mounted on the lower portion of the handle and a trigger switch actuator mounted on the upper portion of the handle.

16. The system in accordance with claim 1 wherein the manifold head is pivotally connected to the handle.

17. The system in accordance with claim 1 wherein the source of pesticide is at least in part mounted on the portable, handheld application tool.

18. The system in accordance with claim 17 wherein the source of pesticide is entirely mounted on the portable, handheld application tool.

19. The system in accordance with claim 1 further comprising a base unit for carrying a pressurization device for pressurizing the source of pesticide and a conduit for fluidly connecting the base unit to the portable, handheld application tool, the portable, handheld application tool being moveable independent of the base unit.

20. The system in accordance with claim 19 further comprising a manually carried portable reservoir for containing the source of pesticide and a conduit for fluidly connecting the portable reservoir to the portable handheld application tool, the portable reservoir being movable independent of the portable, handheld application tool and the base unit.

21. The system in accordance with claim 20 wherein the base unit comprises a wheeled cart.

22. The system in accordance with claim 1 wherein the source of pesticide is a source of insecticide.

23. The system in accordance with claim 22 wherein the source of insecticide is a source of termiticide.

24. The system in accordance with claim 1 wherein the contact plate is a continuous, planar contact plate.

25. The system in accordance with claim 1 wherein the discharge valve comprises a solenoid.

26. A portable handheld application tool for a high pressure injection system for applying pesticide, the portable handheld application tool comprising:

a handle;

a manifold head connected to the handle, the manifold head having at least one internal passage;

a plurality of high pressure nozzles positioned in the manifold head and fluidly connected to the at least one internal passage, the plurality of high pressure nozzles each being operable at pressures of about 25 psi to about 10,000 psi;

a contact plate mounted to the manifold head, the contact plate having a matrix of openings arranged such that at least two of the openings are spaced from each other both longitudinally and transversely with respect to the contact plate, each opening aligned with a respective one of the high pressure nozzles;

a source of pesticide fluidly connected to the a plurality of high pressure nozzles; and a discharge valve moveable between a closed position wherein the pesticide is inhibited from flowing from the plurality of high pressure nozzles and an opened position wherein pesticide flows from the plurality of high pressure nozzles.

27. The portable handheld application tool in accordance with claim 26 wherein the manifold head further comprises at least one low pressure nozzle operable at pressures below about 20 psi.

28. The portable handheld application tool in accordance with claim 26 wherein the at least one low pressure nozzle is positioned adjacent the at least one high pressure nozzle.

29. The portable handheld application tool in accordance with claim 26 wherein each of the at least one low pressure nozzle is concentric with one of the plurality of high pressure nozzles.

30. The portable handheld application tool in accordance with claim 26 further comprising a dispenser for depositing a marker material to indicate where the pesticide has been applied.

31. The portable handheld application tool in accordance with claim 30 wherein the marking material comprises at least one of a foam, a powder, a paint, and a dye.

32. The portable handheld application tool in accordance with claim 26 wherein the contact plate is a plastic material.

33. The portable handheld application tool in accordance with claim 26 further comprising an actuator wherein actuation of the actuator by a user causes the discharge valve to move from the closed position to the opened position.

34. The portable handheld application tool in accordance with claim 33 further comprising a valve closure, the valve closure being adapted to move the discharge valve from the opened position to the closed position.

35. The portable handheld application tool in accordance with claim 34 wherein the valve closure is operable to close the discharge valve after a predetermined amount of pesticide has flowed from the plurality of high pressure nozzles.

36. The portable handheld application tool in accordance with claim 34 wherein the manifold head further comprises at least one low pressure nozzle, the valve closer being operable to close the discharge valve after a predetermined amount of pesticide has flowed from the at least one low pressure nozzle.

37. The portable handheld application tool in accordance with claim 26 wherein the portable handheld application tool comprises a handle having an upper portion and a lower portion, the upper portion being selectively moveable relative to the lower portion between a first position and a second position, a biasing member biases the upper portion toward the first position.

38. The portable handheld application tool in accordance with claim 37 wherein the biasing member comprises a spring.

39. The portable handheld application tool in accordance with claim 37 further comprising an actuator mounted on the handle, wherein actuation of the actuator by a user causes the discharge valve to move from the closed position to the opened position, the actuator being actuated by moving the upper portion of the handle from the first position to the second position.

40. The portable handheld application tool in accordance with claim 39 wherein the actuator comprises a trigger switch mounted on the lower portion of the handle and a trigger switch actuator mounted on the upper portion of the handle.

41. The portable handheld application tool in accordance with claim 26 wherein the manifold head is pivotally connected to the handle.

42. The portable handheld application tool in accordance with claim 26 wherein the source of pesticide is a source of insecticide.

43. The portable handheld application tool in accordance with claim 42 wherein the source of insecticide is a source of termiticide.

44. A high pressure injection system for applying a pesticide, the system comprising:
   a portable, handheld application tool;
   a manifold head connected to said application tool, the manifold head having at least one internal passage;
   a plurality of nozzles positioned in said manifold head and in fluid communication with the at least one internal passage;
   a contact plate mounted to the manifold head, the contact plate having a matrix of openings arranged such that at least two of the openings are spaced from each other both longitudinally and transversely with respect to the contact plate, each opening aligned with the plurality of nozzles;
   a high pressure source of pesticide fluidly connected to the plurality of nozzles, the high pressure source being between about 25 psi and about 10,000 psi; and
   a discharge valve moveable between a closed position wherein the pesticide is inhibited from flowing from the high pressure source to the plurality of nozzles and an opened position wherein pesticide flows from the high pressure source to the plurality of nozzles.

\* \* \* \* \*